US005185202A

United States Patent [19]

[11] Patent Number: 5,185,202
[45] Date of Patent: Feb. 9, 1993

Serizawa et al.

[54] PHOTOGRAPHIC PRINTING PAPER SUPPORT

[75] Inventors: Shinichiro Serizawa; Shigehisa Tamagawa, both of Shizuoka, Japan

[73] Assignee: Fuji Photo Film Co., Ltd., Kanagawa, Japan

[21] Appl. No.: 763,705

[22] Filed: Sep. 23, 1991

[30] Foreign Application Priority Data

Sep. 25, 1990 [JP] Japan .................................. 2-252016

[51] Int. Cl.[5] .......................... B32B 27/38; G03C 1/78

[52] U.S. Cl. .................................... 428/335; 428/414; 428/513; 428/530; 430/598; 162/168.2

[58] Field of Search ............... 428/513, 339, 530, 414; 430/538

[56] References Cited

U.S. PATENT DOCUMENTS

| | | | |
|---|---|---|---|
| 3,255,072 | 6/1966 | Sheetz et al. . | |
| 3,692,092 | 9/1972 | Longoria . | |
| 4,504,576 | 3/1985 | Kemme . | |
| 4,675,245 | 6/1987 | Von Meer | 428/513 X |
| 4,731,291 | 3/1988 | Kerhoff | 428/513 X |
| 4,820,582 | 4/1989 | Merz et al. | 428/513 X |

OTHER PUBLICATIONS

James P. Casy, ed., "Pulp and Paper Chemistry and Chemical Technology", third edition, vol. III, 1981, John Wiley and Sons, New York, pp. 1458-1461.

Patent Abstracts of Japan, vol. 11, No. 279 (P-614) (2726) Sep. 10, 1987.

Journal of Applied Photographic Engineering, vol. 7, No. 3, 1981, pp. 67-72; Klaus B. Kasper et al., "Chemical Formulations and Requirements of Photographic Paper", p. 69.

*Primary Examiner*—P. C. Sluby
*Attorney, Agent, or Firm*—Sughrue, Mion, Zinn, Macpeak & Seas

[57] ABSTRACT

A photographic printing paper support is described in which a raw paper material is prepared at a neutral pH range using a copolymer-type cationic polyacrylamide in the presence, when required, of an epoxidized higher fatty acid amide, both sides of the raw paper being coated with a polyolefin resin. Based on this production process, the permeation of developing solution into the support at the time of development processing can be sufficiently prevented. Also, wetting on the wire during the manufacture of the support can be improved. With the use of the epoxidized higher fatty acid amide as a sizing agent, the production cost can be reduced significantly.

11 Claims, No Drawings

PHOTOGRAPHIC PRINTING PAPER SUPPORT

FIELD OF THE INVENTION

This invention relates to photographic printing paper supports, particularly to a photographic printing paper support in which both sides of a sheet of raw paper are coated with a resin having a film forming ability.

BACKGROUND OF THE INVENTION

In recent years, water resistant supports in which both sides of a sheet of raw paper are coated with polyolefins such as polyethylene have been preferred as photographic printing paper supports, with the aim of preventing treatment solutions from permeating in photographs at the time of their development and fixing, as well as the aim of shortening processing times for washing, drying and the like.

With regard to raw paper, on the other hand, an anionic sizing agent, an anionic paper strength improving agent and, with the aim of fixing these anionic chemicals to pulp materials, an inexpensive aluminum salt have been used as additives in paper materials during paper making processes. Since the use of such additives results in an acidic condition, this kind of raw paper is generally called acidic paper.

In recent years, however, neutral paper has been used more commonly because of its many advantages in terms of the shelf life, improvement of raw paper strength, closing of white water during papermaking processes, prevention of corrosion of facilities and the like.

In raw paper for use as a support in photographic printing paper, it is necessary to use highly sized paper for the purpose of preventing the permeation of developing solution into the support through its cut edges at the time of the processing. As a consequence, when neutral paper is used as a raw paper support for use in photographic printing paper, it is important to employ an alkyl ketene dimer having a self-fixing ability as a sizing agent, as well as a cationic polyacrylamide as a paper strengthening agent (see *Japan Tappi Journal,* vol.41, no.10, p 81 (1989)). In such an instance, papermaking at a neutral range (pH of paper material is between 6.0 and 7.5) has some disadvantages, such as increased drying load due to inferior wetting on a wire compared to the case of papermaking at an acidic range (pH of paper material is at least 3.5 and less than 6.0), as well as the generation of stains on press rolls and the like and the slippery surface of prepared raw paper due to the use of an alkyl ketene dimer as a sizing agent.

With the aim of overcoming the aforementioned problems involved in the art, the inventors of the present invention have conducted intensive studies and found that excellent wetting on a wire and prevention of stain generation during papermaking processes at a neutral pH range can be achieved by the use of a specific cationic polyacrylamide resulting from the copolymerization of acrylamide and a cationic monomer and, as required, an epoxidized higher fatty acid amide, and that a photographic printing paper support obtained by coating both sides of the thus prepared raw paper with a polyolefin resin can prevent the permeation of developing solution through the cutting edge of the support to a marked level. The present invention has been accomplished as a result of these efforts.

SUMMARY OF THE INVENTION

In view of the above, it is a first object of this invention to provide a photographic printing paper support in which the permeation of developing solution into the support at the time of development processing can be prevented sufficiently.

A second object of this invention is to provide a photographic printing paper support which can be produced easily and can improve its production environment.

A third object of this invention is to provide a process for producing neutral paper in which a paper material on a wire exhibits excellent wetting and stains are not generated on rollers during papermaking processes.

In particular, the present invention provides a photographic printing paper support which comprises raw paper having both sides coated with a polyolefin resin, wherein the raw paper contains a cationic polyacrylamide having a molecular weight of about from 500,000 to 1,500,000 and a cationic value of about from 1.5 to 5.0 (ml/g) resulting from copolymerizing acrylamide and a cationic monomer. Preferably, the raw paper further contains an epoxidized higher fatty acid amide and is produced at a neutral pH range.

Other objects and advantages of this invention will be made apparent from the detailed description below.

DETAILED DESCRIPTION OF THE INVENTION

The aforementioned objects of the present invention were accomplished by the development of a photographic printing paper support which comprises raw paper having both sides coated with a polyolefin resin, wherein the raw paper contains a cationic polyacrylamide having a molecular weight of about from 500,000 to 1,500,000 and a cationic value of about from 1.5 to 5.0 resulting from copolymerizing acrylamide and a cationic monomer.

A cationic polyacrylamide obtained by copolymerizing acrylamide and a cationic monomer, which is used in the present invention and is referred to as a "copolymer-type cationic polyacrylamide" hereinafter, may preferably have a molecular weight of from 500,000 to 1,500,000, more preferably from 700,000 to 1,000,000, and also may preferably have a cationic value of from 1.5 to 5.0 (ml/g).

The term "molecular weight" as used herein and in the claims refers to the light scattering molecular weight value measured using liquid chromatography with a light scattering photometer as a detector.

The cationic monomer which is copolymerized with acrylamide may be selected preferably from the group consisting of compounds represented by the following formulae (I) and (II) and salts thereof (e.g., a halogen salt).

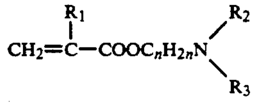
(I)

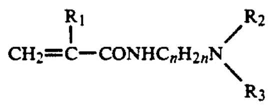
(II)

In the above formulae, $R_1$ represents a hydrogen atom or group having from 1 to 5 carbon atoms, $R_2$ and $R_3$ represent a lower alkyl group having from 1 to 5 carbon atoms, and n is an integer from 1 to 5.

Examples of these cationic monomers are shown below by way of illustration and not by way of limitation.

(1) Dimethylaminoethyl methacrylate $$CH_2{=}C(CH_3)COOCH_2CH_2N(CH_3)_2$$

(2) Diethylaminoethyl methacrylate $$CH_2{=}C(CH_3)COOCH_2CH_2N(CH_2CH_3)_2$$

(3) Chloride of dimethylaminoethylmethyl methacrylate $$[CH_2{=}C(CH_3)COOCH_2CH_2N(CH_3)_2]\cdot Cl$$

(4) Dimethylaminopropyl acrylamide $$CH_2{=}CHCONHCH_2CH_2CH_2N(CH_3)_2$$

According to the present invention, a terpolymer which is prepared by adding (meth)acrylic acid to acrylamide and a cationic monomer, may be used instead of the cationic polyacrylamide copolymer.

The cationic value of the copolymer-type cationic polyacrylamide may be measured in the following manner. About 0.1 g of a sample is accurately weighed and diluted with a dilution solution (water/methanol/acetic acid=89/10/1 by volume percentage), the thus diluted sample is titrated with an aqueous solution of 1/400 N potassium polyvinyl sulfate (PVSK), and then the cationic value is calculated based on the resulting data in accordance with the following equation.

$$\frac{\text{titer (ml)} \times 1/400 \times \text{factor (PVSK)*}}{\text{sample (g)} \times \text{non-volatile content (\%)}/100}$$

*Factor (PVSK) is nearly 1.

For the above equation, the non-volatile content is measured in the following manner. A sample of 3.0±0.2 g of the copolymer-type cationic polyacrylamide is spread uniformly in a Petri dish (50 mm ×15 mm) and weighed accurately, the thus weighed sample is dried at 105±5° C. for about 3 hours in an air circulation-type oven, and then the dried sample is cooled gradually for about 30 min. in a desiccator. Thereafter, the resulting sample is again weighed accurately to measure remaining dry matter, and the non-volatile content is calculated based on the thus obtained data in accordance with the following equation.

$$\text{Non-volatile content (\%)} = \frac{\text{remaining dry matter (g)}}{\text{sample (g)}} \times 100$$

The copolymer-type cationic polyacrylamide may be added in an amount of about from 0.1 to 2.0% by weight, preferably 0.5 to 1.5% by weight, based on the weight of the pulp.

An epoxidized higher fatty acid amide, which has from 12 to 25 carbon atoms, can be used as a sizing agent in the present invention. Illustrative examples include an epoxidized lauric acid amide, an epoxidized myristic acid amide, an epoxidized stearic acid amide, an epoxidized arachidic acid amide and an epoxidized behenic acid amide, etc., and the mixture thereof, which compounds are obtained by the condensation reaction of a fatty acid with a polyvalent amine as disclosed in JP-B-38-20601 (the term "JP-B" as used herein means an "examined Japanese patent publication"), JP-B-39-4507 and U.S. Pat. No. 3,692,092; etc.

In the practice of the present invention, the above fatty acid may preferably be selected from the group consisting of aliphatic monocarboxylic acids and polyvalent carboxylic acids having 8 to 30 carbon atoms, more preferably from those having 12 to 25 carbon atoms. Illustrative examples of these aliphatic carboxylic acids include stearic acid, oleic acid, lauric acid, palmitic acid, arachic acid, behenic acid, tall oil fatty acids, alkyl succinate, alkenyl succinate and the like, of which behenic acid is particularly preferred.

With regard to the polyvalent amines, polyalkylene polyamines, especially those in which 2 or 3 methylene groups are interposed between amino groups, may be used preferably. Illustrative examples of these amines include diethylene triamine, triethylene tetramine, tetraethylene pentamine, pentaethylene hexamine, dipropylene triamine, tripropylene tetramine, aminoethyl ethanolamine, and the like.

The reaction of an aliphatic carboxylic acid with a polyvalent amine may be carried out in such amounts that the amino groups exceed the carboxyl groups in number. In such an instance, if desired, the sizing agent resulting from the reaction of an aliphatic carboxylic acid with a polyvalent amine may be modified by allowing the product to react with urea, adipic acid, maleic acid, phthalic acid, formic acid, formalin, or the like, in order to make the sizing agent into fine particles. The same objective may also be achieved by modifying the sizing agent by carrying out the reaction of the aliphatic carboxylic acid with the polyvalent amine in the presence of a rosin oil resin, a rosin compound to which an $\alpha,\beta$-unsaturated polybasic acid is added, or a petroleum resin to which an $\alpha,\beta$-unsaturated polybasic acid is added, as have been disclosed in JP-B-42-2922, JP-B-45-28722 and JP-A-50-116705 (the term "JP-A" as used herein means an "unexamined published Japanese patent application"). These materials for use in the modification of a cationic sizing agent prepared from an aliphatic carboxylic acid and a polyvalent amine may be used in such a range of amounts that a decrease in the whiteness, sizing ability, and the like of the sizing agent does not occur.

In many cases, for the purpose of obtaining solubility to water or dispersion ability into water, it is preferable to make the reaction product of an aliphatic carboxylic acid with a polyvalent amine into a salt form using an inorganic or organic acid, or into a quaternary salt form by modifying the product with an alkyl halide, benzyl chloride, ethylene chlorohydrin, epichlorohydrin, ethylene oxide, or the like. It is desirable to make the reaction product into a quaternary salt form, in order to maintain its cationic function within a broad pH range and to prevent separation of the sizing agent from the pulp due to mechanical agitation. Excellent sizing effects may be obtained in particular when the reaction product is made into a quaternary salt by making use of epichlorohydrin.

An epoxidized higher fatty acid amide may be added in an amount of less than or equal to about 2.0% by weight, preferably from 0.1 to 2.0% by weight, based on the weight of the pulp.

Being cationic, the aforementioned sizing agent may be effectively when used alone in the pulp, but may preferably be used as a mixture with a polyacrylamide, especially an anionic polyacrylamide. Such an anionic polyacrylamide is a copolymer of acrylamide and acrylic acid, methacrylic acid, maleic anhydride, or the like. A terpolymer derived from the anionic polyacrylamide by partially substituting a portion of acrylamide with acrylonitrile, an acrylate, styrene, or the like, or a partially hydrolyzed product of the polyacrylamide, having a molecular weight of about from 500,000 to 2,000,000, preferably from 800,000 to 1,400,000, as measured by the aforementioned means using a light scattering photometer, may be used in the present invention.

The addition of the anionic polyacrylamide may be effected by uniformly dispersing an aqueous solution of the anionic polyacrylamide into a water-diluted pulp slurry with stirring. The anionic polyacrylamide may preferably be used in an amount of from 0.5 to 1.5% by weight based on the weight of the pulp.

The anionic polyacrylamide may be fixed into the pulp by the addition of a polyvalent metal salt to the pulp slurry in an amount of about 0.1 to 3.0% by weight, preferably 0.5 to 1.5% by weight, based on the weight of the pulp. Water soluble aluminum salts such as aluminum sulfate, aluminum chloride, and the like may be used most preferably as the polyvalent metal salt.

When the pH value of the pulp slurry becomes acidic as a result of the addition of these polyvalent metal salts, it is preferable to adjust the pH value to a neutral range of about from 6.0 to 7.5 with an alkaline compound such as sodium hydroxide, sodium aluminate, or the like, in order to obtain excellent shelf life of the raw paper and therefore of the photographic printing paper support.

In the practice of the present invention, it is preferable to add a polyamide polyamine epichlorohydrin as a wet paper strength improving agent to a paper material in an amount of about from 0.1 to 1.0% by weight based on the weight of the pulp. A dyestuff, a fluorescent whitening agent, an antifoaming agent, and the like may also be added to the paper material.

The addition of the chemicals to the paper material may preferably be carried out in the following order: an anionic polyacrylamide, a water soluble aluminum salt, an alkaline compound, and then a cationic polyacrylamide. The alkaline compound may be added in such a controlled manner that final pH of the paper material becomes about 6.0 to 7.5.

Although the epoxidized higher fatty acid amide may show a good sizing effect independent of the aforementioned addition order of chemical materials, it may be added preferably at an early stage of the addition order because of its good dispersion, which results in a better sizing effect.

A wet paper strength improving agent, such as a polyamide polyamine epichlorohydrin which is used when the occasion demands, may also be added independent of the adding order.

The aforementioned raw paper base may be impregnation-coated with an aqueous solution containing various water soluble additive agents by means of size press, tab size, gate roll coater, or the like. Illustrative examples of such water soluble additive agents include high molecular weight compounds such as starch, polyvinyl alcohol, carboxy-modified polyvinyl alcohol, carboxymethyl cellulose, hydroxyethyl cellulose, sodium alginate, cellulose sulfate, gelatin, casein, and the like; and metal salts such as calcium chloride, sodium chloride, sodium sulfate, and the like.

The aforementioned aqueous solution containing water soluble additive agents may further contain hydroscopic materials such as glycerine, polyethylene glycol, and the like; coloring and whitening agents such as a dyestuff, a fluorescent whitening agent, and the like; and pH controlling agents such as sodium hydroxide, ammonium water, hydrochloric acid, sulfuric acid, sodium carbonate, and the like. If desired, a pigment and the like may also be added to this aqueous solution.

Although the kind and thickness of the raw paper base are not strictly limited, it may desirably have a basis weight of from 50 to 250 g/m$^2$, and may preferably be subjected to a surface treatment with heat and pressure using a machine calender and a super calender, because it is desirable to prepare raw paper having excellent surface smoothness and flatness from a viewpoint of flatness of photographic paper.

According to the present invention, illustrative examples of the polyolefin resin to be coated on both sides of a raw paper base include homopolymers of $\alpha$-olefins such as polyethylene and the like, and mixtures of these polymers. A high density polyethylene, a low density polyethylene, and mixtures thereof may be used as the most preferable types of the polyolefin. The molecular weight of these polyolefins is not particularly limited, provided that a white pigment, a coloring pigment, a fluorescent whitening agent, and the like can be added to a polyolefin layer prepared by means of extrusion coating. Generally, however, a polyolefin having a molecular weight of from 20,000 to 200,000 may be used.

The thickness of the coated polyolefin resin layer is not strictly limited and may be determined in accordance with the thickness of polyolefin layers used in photographic printing paper supports in the art, but the thickness may generally be in the range of from 15 to 50 $\mu$m.

Various additive agents may be added to the polyolefin resin layer, such as a white pigment, a coloring pigment, and a fluorescent whitening agent, as well as stabilizing agents such as phenol, bisphenol, thiobisphenol, amines, benzophenone, salicylates, benzotriazole and organic metal compounds.

In particular, it is preferable to add a white pigment and a coloring pigment to one side of the polyolefin layer upon which a photographic emulsion is superposed.

With regard to the extrusion coating facilities for use in the extrusion coating of the polyolefin layer, a conventional extruder and laminator for polyolefins may be employed.

With the support of the present invention, photographic printing paper can be prepared by applying and drying a photographic emulsion layer on the glossy surface side of the support, while the opposite side of the support may be used for various purposes, for example, by superposing a print keeping layer as disclosed in JP-A-62-6256.

Examples of the present invention are given below by way of illustration and not by way of limitation. All parts, percents, ratios, and the like are by weight unless otherwise stated.

EXAMPLES 1 TO 4

A pulp slurry with Canadian freeness of 250 cc (measured according to JIS (Japanese Industrial Standard)

P-8121) was prepared by beating a wood pulp mixture of Laubholz Bleached Kraft pulp and Nadelholz Bleached Kraft pulp at a ratio of 2:1, and the resulting slurry was diluted with water. To this diluted slurry were added, with stirring, (1) an anionic polyacrylamide having a molecular weight of about 1,100,000 (trade name, Polystron 194; manufactured by Arakawa Kagaku Co., Ltd.), (2) aluminum sulfate, and (3) a polyamide polyamine epichlorohydrin (trade name, Kaimen 557; manufactured by Dick Hercules Co., Ltd.). To the resulting mixture were further added (4) an epoxidized behenic acid amide, (5) sodium hydroxide to adjust the pH value to 7, (6) a cationic polyacrylamide, and (7) an antifoaming agent. The amount of each chemical material is shown in Table 1. For each of Examples, these chemicals were added in the order of from (1) to (7).

The cationic polyacrylamide used as the ingredient (6) is an N,N,-dimethylaminoalkyl acrylamide, which is a co- or terpolymer prepared from acrylamide, acrylic acid, and dimethylaminopropyl acrylamide of a cationic monomer, at a polymerization ratio of 60/0/40 (Example 1), 65/10/25 (Example 2), 80/10/10 (Example 3) and 65/10/25 (Example 4), respectively.

TABLE 1

| | Chemicals added (% by weight based on pulp) | | | | | | | Final pH |
|---|---|---|---|---|---|---|---|---|
| Examples | (1) | (2) | (3) | (4) | (5) | (6) [MW*; CV**] | (7) | of paper material |
| 1 | 0.7 | 1.2 | 0.3 | 0.5 | pH = 7 | 0.8 [700,000; 5.0] | 0.01 | 7.0 |
| 2 | 1.0 | 1.0 | 0.3 | 0.5 | pH = 7 | 0.5 [900,000; 2.8] | 0.01 | 6.9 |
| 3 | 1.2 | 2.0 | 0.3 | 0.5 | pH = 7 | 0.3 [1,400,000; 1.5] | 0.01 | 6.8 |
| 4 | 0.8 | 1.0 | 0.3 | 0.5 | pH = 7 | 0.6 [900,000; 2.8] | 0.01 | 7.1 |

Note: *, molecular weight; **, cationic value

When all of the chemicals were added to each of the thus prepared pulp slurries and the resulting paper material was allowed to stand for 60 minutes, no generation of coagulation was found in any of the paper materials, as shown in Table 2.

A three gram portion (on a dry weight basis) of each paper material after the addition of the chemicals was subjected to the measurement of its freeness in accordance with the JIS (Japanese Industrial Standard) P8121, with the results shown in Table 2.

Each of the pulp slurries prepared above was made into raw paper in such a manner that its basis weight became 180 g/m$^2$, and the surface of the thus obtained raw paper was coated with the following sizing solution at a density of 30 g/m$^2$ by means of size press.

| | | |
|---|---|---|
| Polyvinyl alcohol | 5.0% | by weight |
| Calcium chloride | 4.0% | by weight |
| Fluorescent whitening agent | 0.5% | by weight |
| Antifoaming agent | 0.005% | by weight |
| Water | 90.495% | by weight |

The thickness of the thus coated paper with the sizing solution was adjusted to 173 μm using a machine calender. The back side of the resulting paper was subjected to a corona discharge treatment and then coated with polyethylene of a density of 0.980 g/m$^2$ to a thickness of about 30 μm. Thereafter, the front side of the resulting paper (the side to be coated with a photographic emulsion) was subjected to a corona discharge treatment and then coated with polyethylene containing 10% by weight of titanium oxide having a density of 0.960 g/m$^2$ to a thickness of about 30 μm to obtain a photographic printing paper support.

From each of the thus obtained supports, 3 test specimens (10 cm x 1.5 cm) were prepared. These test specimens were weighed and then soaked in a developing solution (trade name, Papitol or CP-20AP, manufactured by Fuji Photo Film Co., Ltd.) for 3 minutes and 30 seconds at 33° C. The specimens were weighed again, with the results shown in Table 2.

COMPARATIVE EXAMPLE 1

A sample was prepared by repeating the process of Examples, except that, for the chemicals, 1.5% by weight of a cationic polyacrylamide having a molecular weight of about 500,000 (trade name, Polystron 655; manufactured by Arakawa Kagaku Co., Ltd.), 0.5% by weight of a polyamide polyamine epichlorohydrin, 0.5% by weight of an alkyl ketene dimer (mixture of pentadecyl ketene dimer and heptadecyl ketene dimer) and 0.01% by weight of an antifoaming agent were added in that order.

COMPARATIVE EXAMPLE 2

A sample was prepared by repeating the process of Examples, except that, for the chemicals, 0.75% by weight of a cationic polyacrylamide having a molecular weight of about 500,000 (trade name, Polystron 655; manufactured by Arakawa Kagaku Co., Ltd.), 0.5% by weight of a polyamide polyamine epichlorohydrin, 0.75% by weight of an anionic polyacrylamide, 0.5% by weight of an alkyl ketene dimer (mixture of pentadecyl ketene dimer and heptadecyl ketene dimer), and 0.01% by weight of an antifoaming agent were added in that order.

COMPARATIVE EXAMPLE 3

A sample was prepared by repeating the process of Examples, except that, for the chemicals, 1.5% by weight of the same anionic polyacrylamide as employed in Examples, 2.0% by weight of aluminum sulfate, 0.3% by weight of a polyamide polyamine epichlorohydrin, 10% sodium hydroxide solution to obtain a pulp slurry of pH 7, 0.5% by weight of an epoxidized behenic acid amide, 0.02% by weight of an anionic polyacrylamide having a molecular weight of about 10,000,000, and 0.01% by weight of an antifoaming agent were added in that order.

The generation of coagulation, freeness and sizing function of the paper materials obtained in Comparative Examples 1 to 3 and the thus prepared comparative supports were examined in the same manner as in Examples, with the results shown below in Table 2.

TABLE 2

| | Examples | | | | Com. Examples | | |
|---|---|---|---|---|---|---|---|
| | 1 | 2 | 3 | 4 | 1 | 2 | 3 |
| Freeness CSF (cc) | 300 | 308 | 306 | 302 | 262 | 270 | 298 |
| Coagulation | no | no | no | no | no | no | yes |
| | Sizing function (increase in weight, mg) | | | | | | |
| Papitol | 10.0 | 9.5 | 10.7 | 9.7 | 12.0 | 12.0 | 11.8 |
| CP-20AP | 15.2 | 15.0 | 15.4 | 15.1 | 29.6 | 29.0 | 16.0 |

As is evident from Table 2, the photographic printing paper support of the present invention has an excellent sizing function and wetting on a wire (freeness of about 300 cc or more), as well as excellent production feasibility without occurrence of coagulation.

Thus, it is apparent that the present invention provides an excellent photographic printing paper support which is produced by coating both sides of raw paper with a resin having film forming ability. According to the support of this invention, the permeation of developing solution into the support at the time of development processing can be prevented sufficiently, the support can be produced easily, and the environment for its production can improve. This invention also provides a process for producing neutral paper in which a paper material on a wire shows excellent wetting, and in which stains are not generated on rollers during papermaking processes.

While the present invention has been described in conjunction with specific embodiments thereof, it is evident that many alternatives, modifications and variations will be apparent to those skilled in the air in light of the foregoing description. Accordingly, it is intended to include all such alternatives, modifications and variations as set forth within the spirit and scope of the appended claims.

What is claimed is:

1. A photographic printing paper support which comprises raw paper having both sides coated with a polyolefin resin, wherein said raw paper contains a cationic polyacrylamide having a molecular weight of from 500,000 to 1,500,000 and a cationic value of from 1.5 to 5.0 (ml/g) resulting from copolymerizing acrylamide and a cationic monomer.

2. A photographic printing paper support according to claim 1, wherein said raw paper further contains an epoxidized higher fatty acid amide and is produced at a neutral pH range.

3. A photographic printing paper support according to claim 1, wherein said cationic polyacrylamide has a molecular weight of from 700,000 to 1,000,000.

4. A photographic printing paper support according to claim 1, wherein said cationic monomer is selected from the group consisting of compounds represented by formulae (I) and (II) and salts thereof:

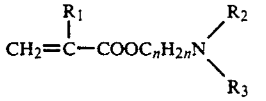
(I)

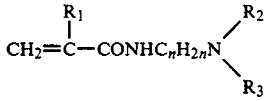
(II)

wherein R represents a hydrogen atom or a lower alkyl group, $R_2$ and $R_3$ represent a lower alkyl group, and n is an integer from 1 to 5.

5. A photographic printing paper support according to claim 2, wherein said epoxidized higher fatty acid amide is prepared from a fatty acid selected from the group consisting of aliphatic monocarboxylic acids and polyvalent carboxylic acids having from 8 to 30 carbon atoms.

6. A photographic printing paper support according to claim 5, wherein said aliphatic monocarboxylic acids and said polyvalent carboxylic acids have from 12 to 25 carbon atoms.

7. A photographic printing paper support according to claim 6, wherein said aliphatic carboxylic acid is behenic acid.

8. A photographic printing paper support according to claim 2, wherein said epoxidized higher fatty acid amide is present in an amount of at most 2.0% by weight based on the weight of pulp in the raw paper.

9. A photographic printing- paper support according to claim 8, wherein said epoxidized higher fatty acid amide is present in an amount of from 0.1 to 2.0% by weight based on the weight of pulp.

10. A photographic printing paper support according to claim 1, wherein said raw paper further contains a polyamide polyamine epichlorohydrin in an amount of from 0.1 to 1.0% by weight based on the weight of pulp in the raw paper.

11. A photographic printing paper support according to claim 1, wherein said polyolefin resin is coated at a thickness of from 15 to 50 μm.

* * * * *